United States Patent
Casella

(10) Patent No.: US 11,954,316 B2
(45) Date of Patent: Apr. 9, 2024

(54) METHOD AND DEVICE FOR ASSIGNING AN OPERATION SET

(71) Applicant: Apple Inc., Cupertino, CA (US)

(72) Inventor: Tyler Casella, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/741,610

(22) Filed: May 11, 2022

(65) Prior Publication Data

US 2022/0269398 A1 Aug. 25, 2022

Related U.S. Application Data

(63) Continuation of application No. 17/148,770, filed on Jan. 14, 2021, now Pat. No. 11,354,026.

(60) Provisional application No. 62/966,818, filed on Jan. 28, 2020.

(51) Int. Cl.
| | |
|---|---|
| G06F 3/01 | (2006.01) |
| G06F 3/04815 | (2022.01) |
| G06F 3/04845 | (2022.01) |
| G06F 3/04883 | (2022.01) |
| G06F 3/16 | (2006.01) |

(52) U.S. Cl.
CPC .......... *G06F 3/04845* (2013.01); *G06F 3/011* (2013.01); *G06F 3/04815* (2013.01); *G06F 3/04883* (2013.01); *G06F 3/167* (2013.01)

(58) Field of Classification Search
CPC ................................ G06F 3/048–05
See application file for complete search history.

(56) References Cited

U.S. PATENT DOCUMENTS

| | | | |
|---|---|---|---|
| 9,367,806 B1 * | 6/2016 | Cosic ................... | G06F 16/2379 |
| 9,996,164 B2 * | 6/2018 | Gummadi ............... | G06F 3/017 |
| 10,306,193 B2 * | 5/2019 | Weber .................. | G06V 10/147 |
| 10,360,946 B1 * | 7/2019 | Pasala .................. | G11B 27/036 |
| 10,402,068 B1 * | 9/2019 | Dodge ................ | G06F 3/04845 |
| 10,521,249 B1 * | 12/2019 | Newcomb ............... | G06F 9/451 |
| 10,802,695 B2 * | 10/2020 | Daniels .................... | G06F 15/16 |
| 2006/0199616 A1 * | 9/2006 | Landschaft ......... | H04M 1/2747 |
| | | | 455/566 |
| 2008/0177994 A1 * | 7/2008 | Mayer ..................... | G06F 16/00 |
| | | | 709/224 |
| 2009/0007006 A1 * | 1/2009 | Liu ........................ | G06F 3/0485 |
| | | | 715/784 |

(Continued)

OTHER PUBLICATIONS

ComputerHope.com, "Size", archived on Aug. 28, 2013 at <<http://web.archive.org>>, available at <<https://www.computerhope.com/jargon/s/size.htm>>, 2 pages. (Year: 2013).*

*Primary Examiner* — Daniel Rodriguez
(74) *Attorney, Agent, or Firm* — Fernando & Partners, LLP

(57) ABSTRACT

In some implementations, a method includes: while presenting an object via the display device, determining an operation set associated with the object that includes a plurality of input-response pairings, wherein each input-response pairing includes an input type and an associated response; obtaining, via the one or more input devices, a user input directed to the object; and, in response to detecting the user input: mapping the user input to an input-response pairing within the operation set associated with the object; and performing an operation on the object based on the user input and the input-response pairing.

23 Claims, 8 Drawing Sheets

(56) References Cited

U.S. PATENT DOCUMENTS

| | | | |
|---|---|---|---|
| 2010/0149090 A1* | 6/2010 | Morris | H04L 67/01 345/156 |
| 2012/0284332 A1* | 11/2012 | Pradeep | G06Q 30/0269 709/204 |
| 2012/0313865 A1* | 12/2012 | Pearce | G06F 3/046 345/173 |
| 2013/0156266 A1* | 6/2013 | Horii | G02B 27/017 382/103 |
| 2013/0185642 A1* | 7/2013 | Gammons | G06F 3/04817 715/765 |
| 2013/0232430 A1* | 9/2013 | Reitan | G09G 3/003 715/765 |
| 2013/0335303 A1* | 12/2013 | Maciocci | G02B 27/017 345/8 |
| 2014/0195967 A1* | 7/2014 | Abe | G06F 3/04883 715/800 |
| 2014/0208263 A1* | 7/2014 | Maklouf | G06T 11/203 715/802 |
| 2014/0274159 A1* | 9/2014 | Bernheim Brush | H04M 1/72454 702/181 |
| 2015/0181200 A1* | 6/2015 | Arrasvuori | H04N 13/275 348/46 |
| 2015/0227194 A1* | 8/2015 | Kubota | G06F 3/013 345/156 |
| 2016/0035139 A1* | 2/2016 | Fuchs | G06T 19/006 345/633 |
| 2016/0150070 A1* | 5/2016 | Goren | H04M 1/72421 455/418 |
| 2016/0379418 A1* | 12/2016 | Osborn | G03H 1/08 345/589 |
| 2017/0109936 A1* | 4/2017 | Powderly | G06F 3/012 |
| 2017/0329419 A1* | 11/2017 | Dearman | G06F 3/0346 |
| 2017/0337742 A1* | 11/2017 | Powderly | G06K 7/1408 |
| 2018/0011772 A1* | 1/2018 | Meyer | G06F 13/385 |
| 2018/0173403 A1* | 6/2018 | Carbune | G06F 9/451 |
| 2018/0376050 A1* | 12/2018 | Endo | H04N 5/04 |
| 2019/0146219 A1* | 5/2019 | Rodriguez | G06F 21/36 345/633 |
| 2019/0187870 A1* | 6/2019 | Bostick | G06F 3/04886 |
| 2019/0339820 A1* | 11/2019 | Wu | G06N 20/00 |
| 2019/0368868 A1* | 12/2019 | Abovitz | A63F 13/428 |
| 2020/0204649 A1* | 6/2020 | Fowe | H04L 67/131 |
| 2020/0302686 A1* | 9/2020 | Totty | G06T 17/05 |
| 2020/0312299 A1* | 10/2020 | Nama | G06N 20/00 |
| 2021/0064129 A1* | 3/2021 | Yasuda | G02B 27/0172 |
| 2021/0191604 A1* | 6/2021 | Iliffe-Moon | B60K 35/00 |

* cited by examiner

METHOD AND DEVICE FOR ASSIGNING AN OPERATION SET

CROSS-REFERENCE TO RELATED APPLICATIONS

This application claims the benefit of U.S. Provisional Patent App. No. 62/966,818, filed on Jan. 28, 2020, and U.S. Non-Provisional patent application Ser. No. 17/148,770, filed on Jan. 14, 2021, which are incorporated by reference in their entireties.

TECHNICAL FIELD

The present disclosure generally relates to systems, methods, and devices for assigning an operation set to an object.

BACKGROUND

In some instances, developers of computer-generated (CG) content applications may spend significant time and other resources programming various inputs (e.g., touch gestures, hand tracking, eye tracking, body pose, etc.) and the associated responses when performed on CG content. As such, in some implementations, a CG-based operating system (OS) may include pre-programmed input-response sets that a developer can assign to various CG objects. Use of such pre-programmed input-response sets provides a more consistent experience for end users across CG applications. Further, the pre-programmed input-response sets can be modified on the backend (e.g., made more efficient) for multiple applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
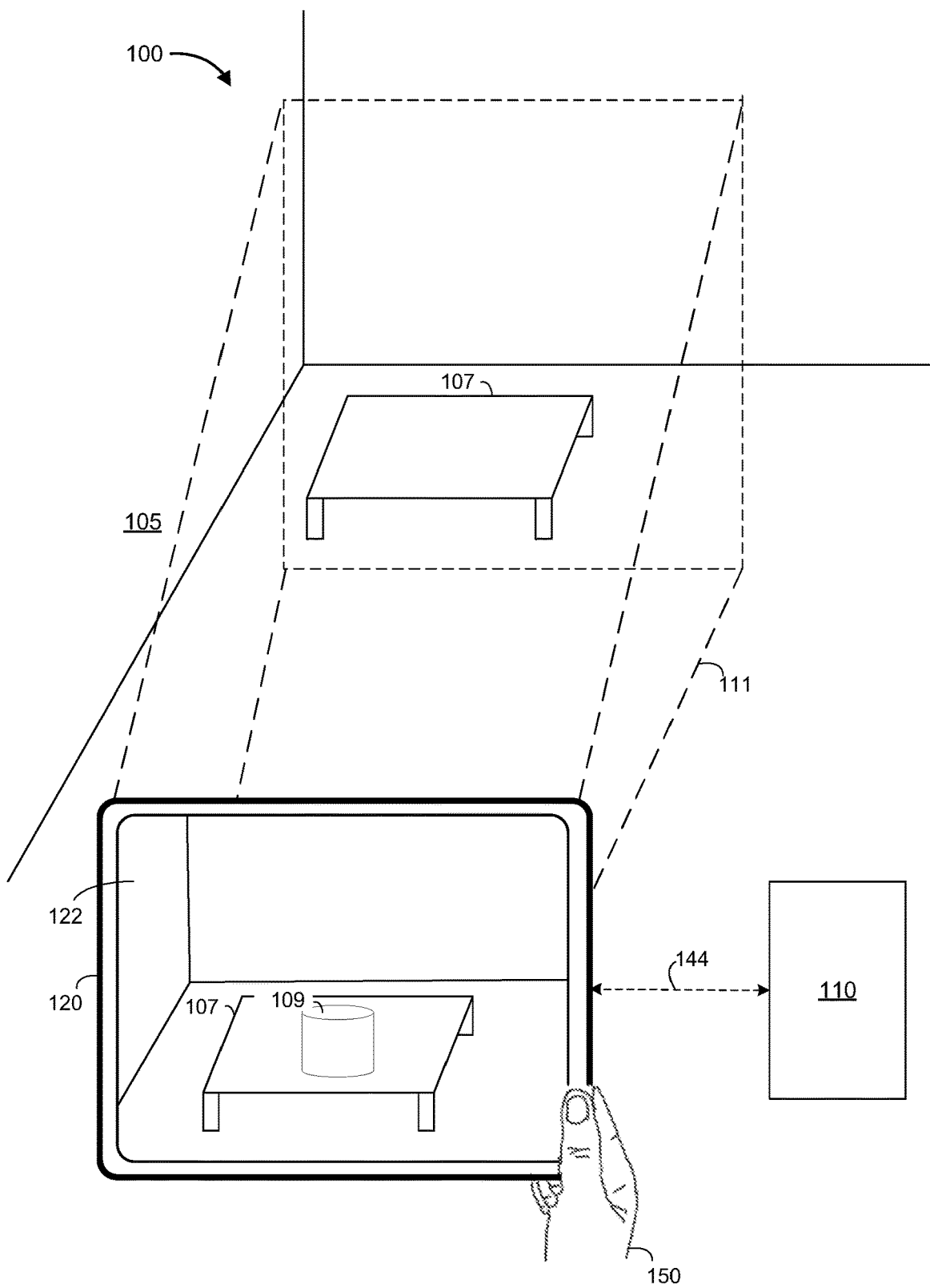
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for assigning an operation set to an object such as an XR object within an XR environment. According to some implementations, the method is performed at a computing system including non-transitory memory and one or more processors, wherein the computing system is communicatively coupled to a display device and one or more input devices. The method includes: while presenting an object environment via the display device, determining an operation set associated with the object that includes a plurality of input-response pairings, wherein each input-response pairing includes an input type and an associated response; obtaining, via the one or more input devices, a user input directed to the object; and, in response to detecting the user input: mapping the user input to an input-response pairing within the operation set associated with the object; and performing an operation on the object based on the user input and the input-response pairing.

In accordance with some implementations, a device includes one or more display devices, one or more input devices, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device with one or more display devices and one or more input devices, cause the device to perform or cause performance of any of the methods described herein. In accordance with some implementations, a device includes: one or more display devices, one or more input devices, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate an XR experience for a user 150 (sometimes also referred to herein as an "XR environment" or a "graphical environment" or a "computer-generated environment"). In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the XR environment to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR environment to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR environment, the electronic device 120 is configured to present XR content (sometimes also referred to herein as or a "graphical content" or a "computer-generated content" or "virtual content") (e.g., an XR cylinder 109) and to enable video pass-through of the physical environment 105 (e.g., including the table 107) on a display 122. For example, the electronic device 120 corresponds to a mobile phone, tablet, laptop, wearable computing device, or the like.

In one example, the XR cylinder 109 corresponds to display-locked content such that the XR cylinder 109 remains displayed at the same location on the display 122 as the FOV 111 changes due to translational and/or rotational movement of the electronic device 120. With reference to this example, as the FOV 111 changes, the XR environment maintains display of the XR cylinder 109 remains displayed at its origin location on the display 122. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment by displaying data corresponding to the XR environment on the one or more displays or by projecting data corresponding to the XR environment onto the retinas of the user 150.

In some implementations, the electronic device 120 includes an integrated display (e.g., a built-in display) that displays the XR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
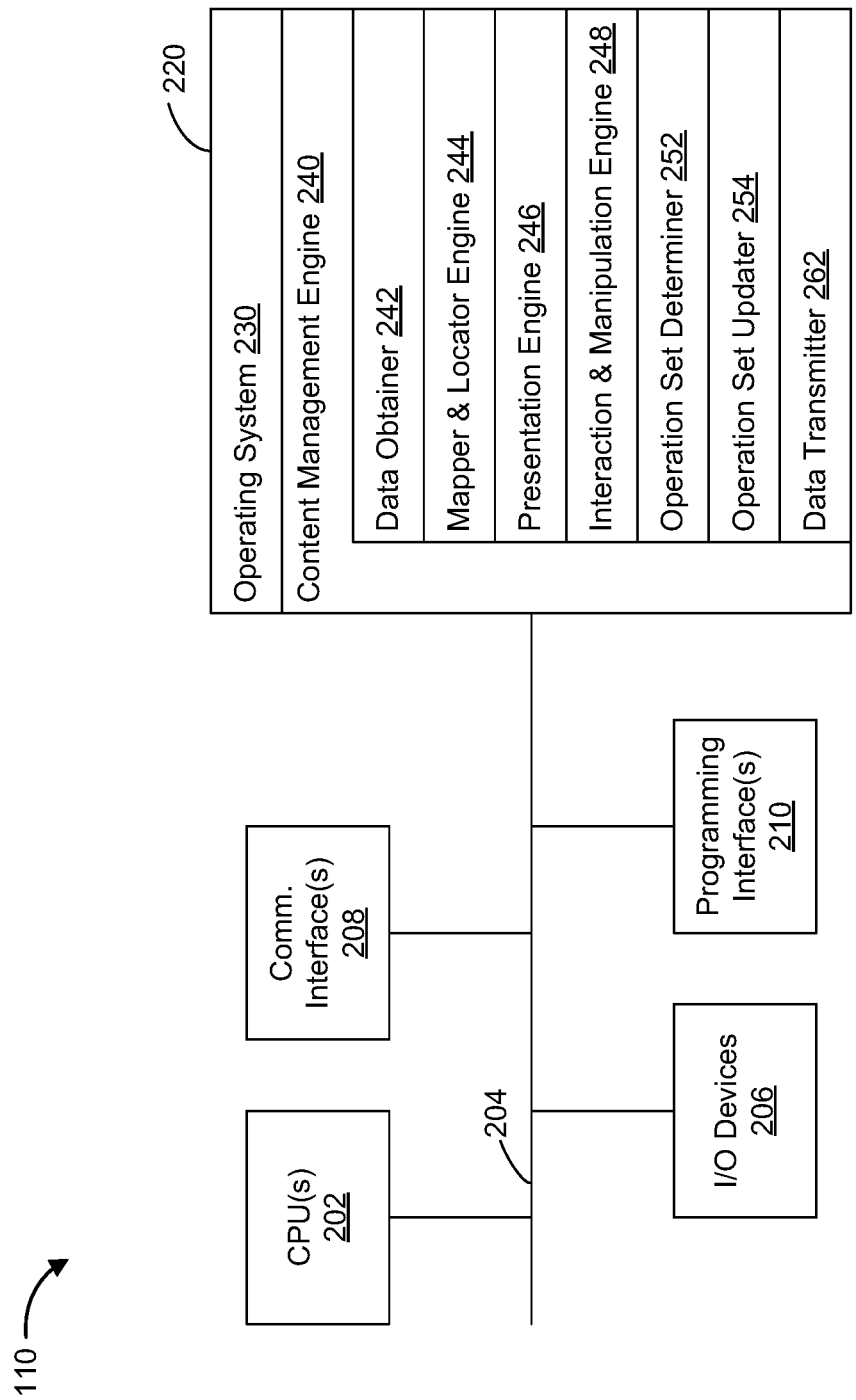
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a content management engine 240.

The operating system 230 includes procedures for handling various basic system services and for performing hardware dependent tasks.

In some implementations, the content management engine 240 is configured to manage and coordinate one or more XR experiences (sometimes also referred to herein as "XR environments" or "graphical environments" or "computer-generated environments") for one or more users (e.g., a single XR experience for one or more users, or multiple XR experiences for respective groups of one or more users). To that end, in various implementations, the content management engine 240 includes a data obtainer 242, a mapper and locator engine 244, a presentation engine 246, an interaction and manipulation engine 248, an operation set determiner 252, an operation set updater 254, and a data transmitter 262.

In some implementations, the data obtainer 242 is configured to obtain data (e.g., presentation data, input data, image frames, user interaction data, head tracking information, camera pose tracking information, eye tracking information, hand/limb tracking information, depth information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the presentation engine 246 is configured to generate (i.e., render), manage, and modify content and/or an XR environment presented to a user. To that end, in various implementations, the presentation engine 246 includes instructions and/or logic therefor, and heuristics and metadata therefor.

In some implementations, the interaction and manipulation engine 248 is configured to interpret user interactions and/or modification inputs directed to the content and/or the XR environment. In some implementations, the interaction and manipulation engine 248 also is configured to update the XR environment when a viewpoint of the XR environment changes (e.g., due to translational and/or rotational movement of the electronic device 120). To that end, in various implementations, the interaction and manipulation engine 248 includes instructions and/or logic therefor, and heuristics and metadata therefor.

In some implementations, the operation set determiner 252 is configured to determine an operation set for an object (e.g., an XR object within the XR environment) based on a currently running application, crowd-sourced information, user history information, user preferences, manual user selections, manual content creator selections, and/or the like. For example, the operation set includes a plurality of input-response pairings, where each input-response pairing includes an input type and an associated response. In some implementations, the operation set determiner 252 is configured to provide an indication of at least one of the input-response pairings (e.g., a textual, aural, pictorial, etc. hint or tutorial). In some implementations, the operation set determiner 252 is configured to provide an indication of at least one interactive portion of the object (e.g., a textual, aural, pictorial, etc. hint or tutorial). To that end, in various implementations, the operation set determiner 252 includes instructions and/or logic therefor, and heuristics and metadata therefor.

In some implementations, the operation set updater 254 is configured to update the operation set associated with the object by modifying a magnitude of at least one response based on user history information. In some implementations, the operation set updater 254 is configured to update the operation set associated with the object by adding at least one auto-complete sequence to the operation set. In some implementations, the operation set updater 254 is configured to update the operation set associated with the object by adding, removing, or modifying at least one input-response pairing based on user inputs or menu selections. To that end, in various implementations, the operation set updater 254 includes instructions and/or logic therefor, and heuristics and metadata therefor.

In some implementations, the data transmitter 262 is configured to transmit data (e.g., presentation data such as rendered image frames associated with the XR environment, location data, etc.) to at least the electronic device 120. To that end, in various implementations, the data transmitter 262 includes instructions and/or logic therefor, and heuristics and metadata therefor.

Although the data obtainer 242, the mapper and locator engine 244, the presentation engine 246, the interaction and manipulation engine 248, the operation set determiner 252, the operation set updater 254, and the data transmitter 262 are shown as residing on a single device (e.g., the controller 110), it should be understood that in other implementations, any combination of the data obtainer 242, the mapper and locator engine 244, the presentation engine 246, the interaction and manipulation engine 248, the operation set determiner 252, the operation set updater 254, and the data transmitter 262 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
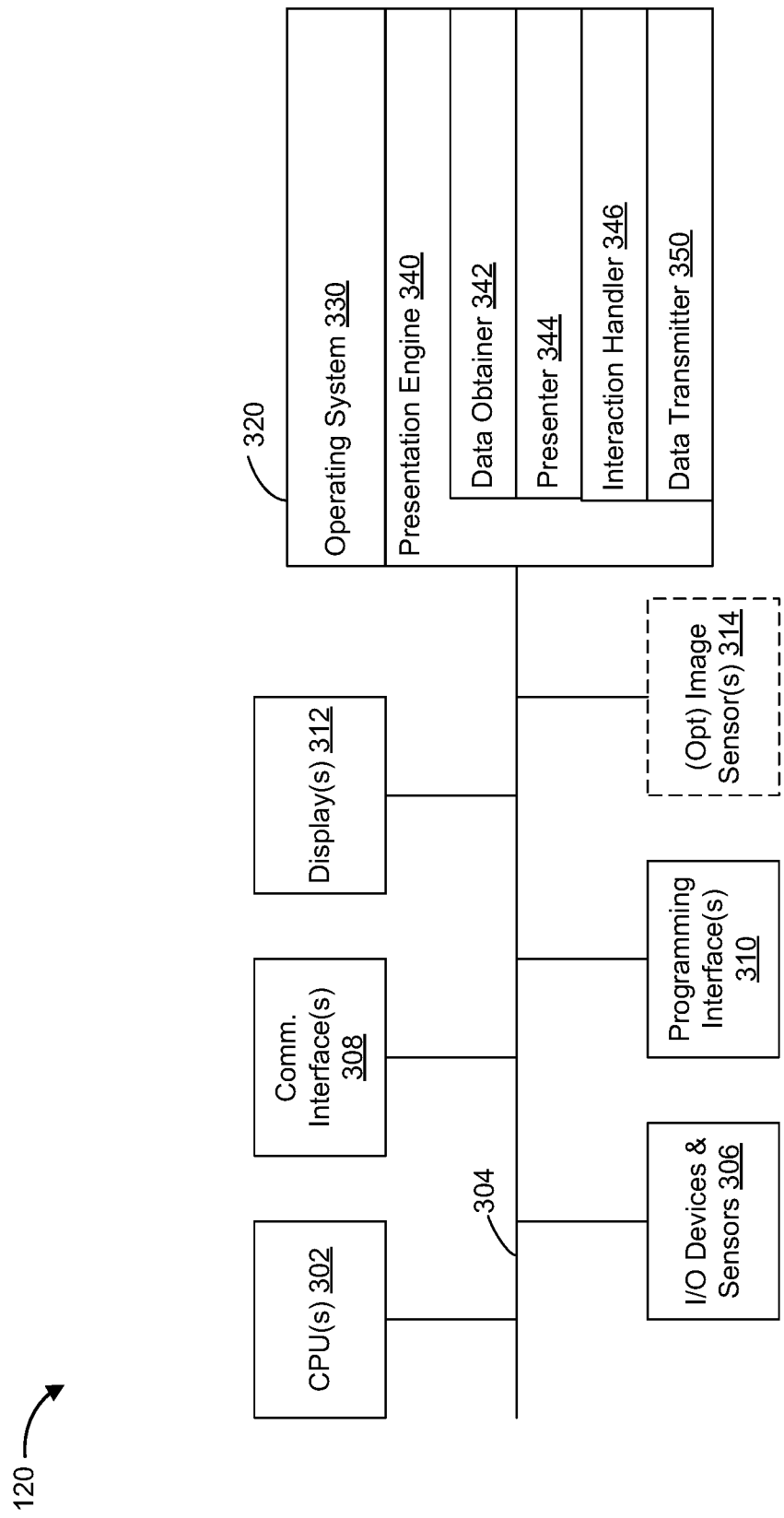
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, LiDAR, or the like), an eye tracking engine, a body pose tracking engine, a hand/limb tracking engine, a head pose tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present content and/or an XR environment to the user via the one or more displays 312. To that end, in various implementations, the presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, body pose tracking information, hand/limb tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update the content and/or the XR environment (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented content and/or the XR environment. To that end, in various implementations, the interaction handler 346 includes instructions and/or logic therefor, and heuristics and metadata therefor.

In some implementations, the data transmitter 350 is configured to transmit data (e.g., presentation data, location data, image frames, user interaction data, head tracking information, camera pose tracking information, eye tracking information, body pose tracking information, hand/limb tracking information, depth information, sensor data, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
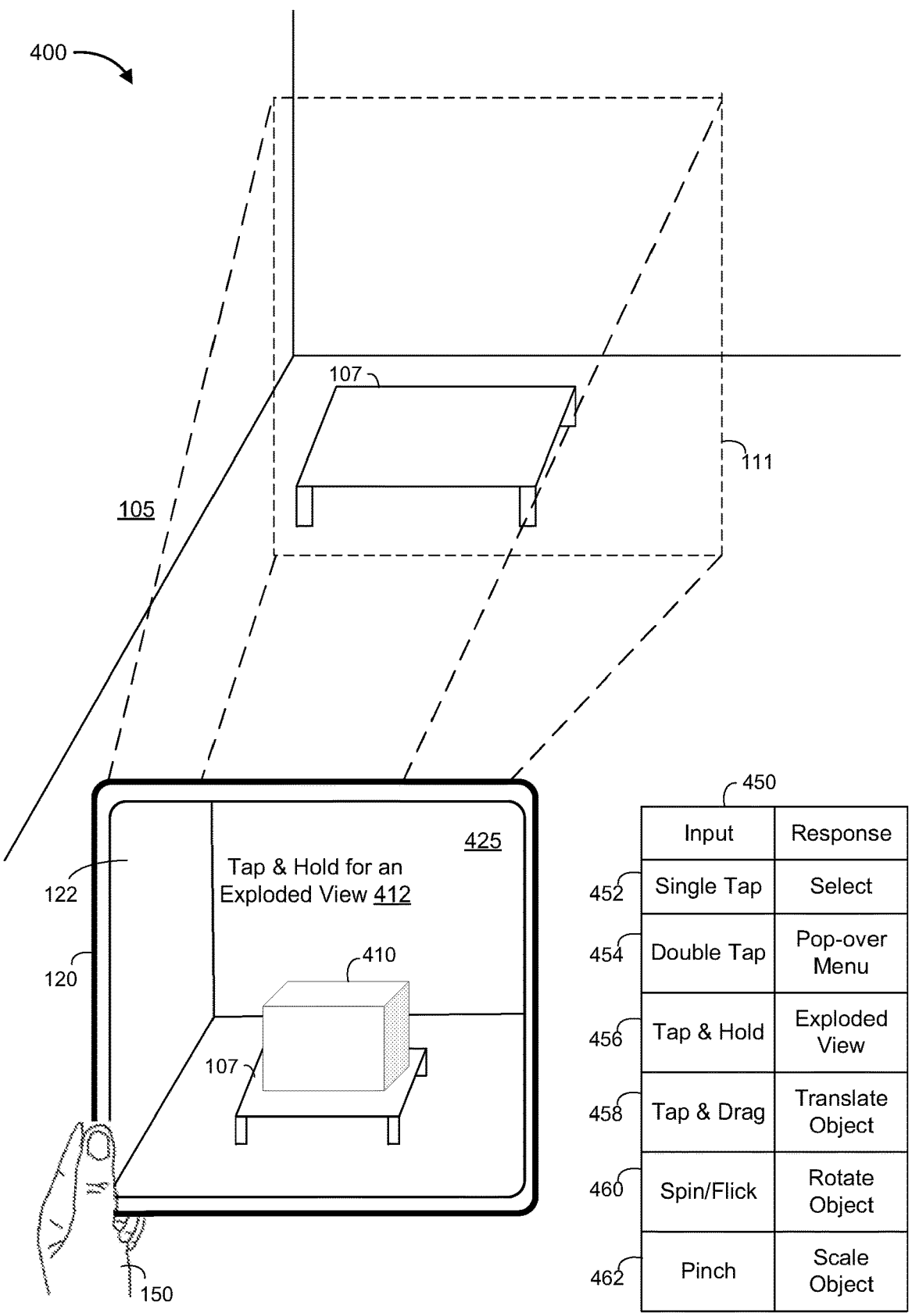
FIG. 4A illustrates an extended reality (XR) presentation scenario in accordance with some implementations.

FIG. 4A illustrates an example extended reality (XR) presentation scenario 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 4A, the XR presentation scenario 400 includes a physical environment 105 and an XR environment 425 displayed on the display 122 of the electronic device 120. The electronic device 120 presents an XR environment 425 to the user 150 while the user 150 is physically present within the physical environment 105 that includes the table 107 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 (e.g., including the table 107) on the display 122. In some implementations, the electronic device 120 can include an additive display to present XR content and to enable optical see-through of at least a portion of the physical environment 105 (e.g., including the table 107) through the additive display. For example, the electronic device 120 corresponds to a mobile phone, tablet, laptop, wearable computing device, or the like. One of ordinary skill in the art will appreciate how the XR presentation scenario 400 may be adapted to suit a fully or partially virtual environment.

As shown in FIG. 4A, the XR environment 425 is associated with a content creation application. As such, the XR environment 425 includes an XR object 410 created by the user 150 or imported into the XR environment 425 by the user 150. In the example shown in FIG. 4A, an operation set 450 is associated with the XR object 410 based on the content creation application associated with the XR environment 425 (e.g., default input-response pairings for the content creation application), crowd-sourced information associated with the content creation application, user history information associated with the content creation application, user preferences, manual user selections (e.g., input-response pairings set by the user), and/or the like.

As shown in FIG. 4A, the operation set 450 includes a plurality of input-response pairings: an input-response pairing 452 that corresponds to selecting the XR object 410 or a portion thereof in response to a single tap input directed thereto; an input-response pairing 454 that corresponds to presenting a pop-over menu including additional operations (e.g., coloring, texturing, shading, deleting, etc.) for performance on the XR object 410 or a portion thereof in response to a double tap input directed thereto; an input-response pairing 456 that corresponds to providing an exploded view of the XR object 410 in response to a tap and hold input directed thereto; an input-response pairing 458 that corresponds to translating the XR object 410 in response to a tap and drag input directed thereto (e.g., the displacement of the translation operation is based on the magnitude of the drag); an input-response pairing 460 that corresponds to rotating the XR object 410 in response to a spin or flick input directed thereto (e.g., the displacement of the rotation operation is based on the velocity of the spin or flick); and an input-response pairing 462 that corresponds to scaling the XR object 410 in response to a pinch input directed thereto (e.g., the rate of change of the scaling operation is based on the velocity or magnitude of the pinch). The XR environment 425 also includes an indication 412 informing the user 150 of the input-response pairing 456. One of ordinary skill in the art will appreciate that the input-response pairings in the operation set 450 may be modified in myriad ways. One of ordinary skill in the art will appreciate that the responses within the operation set 450 may differ based on the location of a user input such as a first response after detecting a single tap on a corner of the XR object 410 and a second response different from the first response after detecting with a single tap on a face of the XR object 410. Furthermore, one of ordinary skill in the art will appreciate that various other input-response pairings may be added to the operation set 450.

Figure 4B:
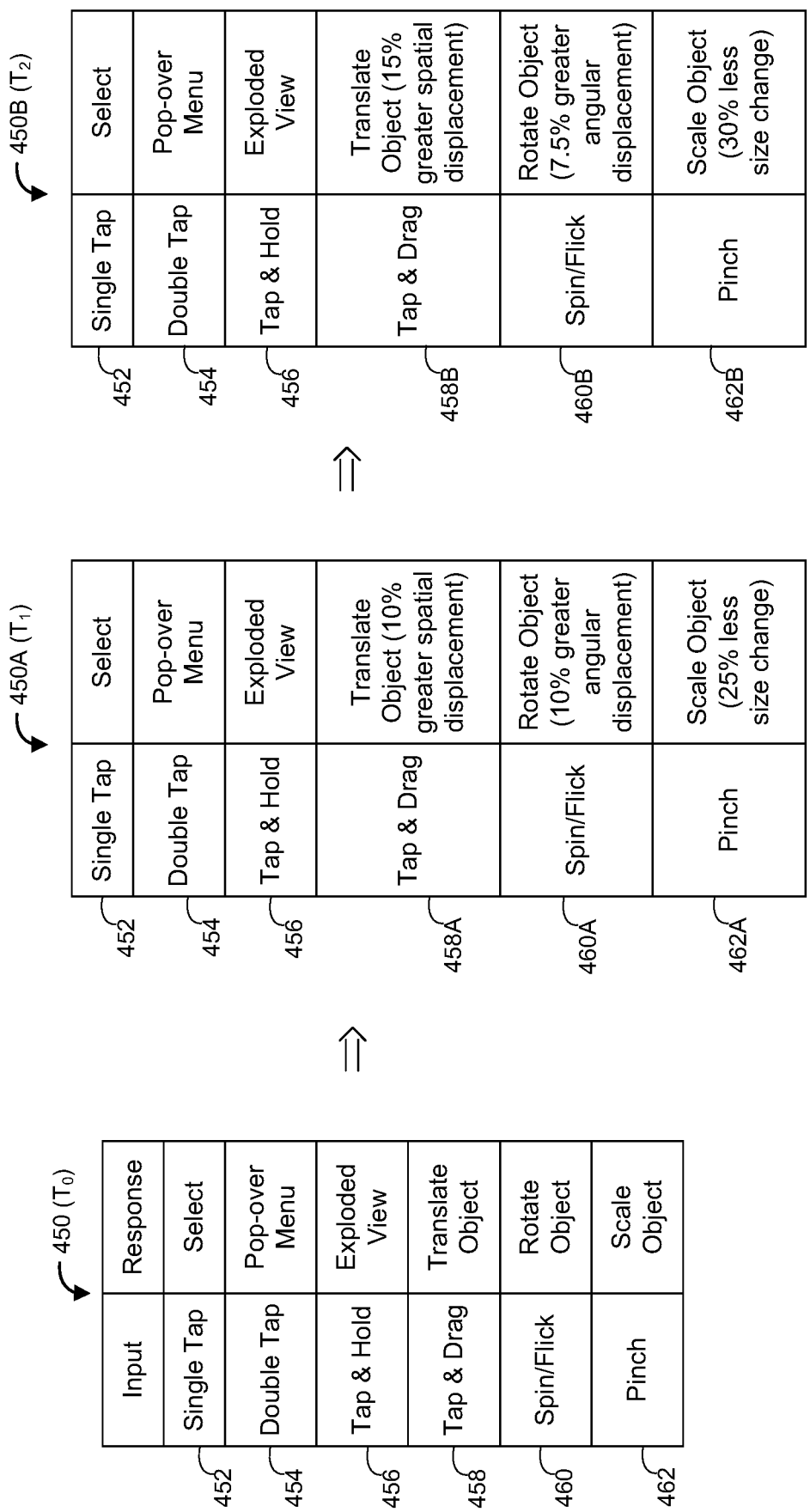
FIG. 4B illustrates a sequence of example changes to the operation set in FIG. 4A over time in accordance with some implementations.

FIG. 4B illustrates a sequence of example changes to the operation set 450 in FIG. 4A over time in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

According to some implementations, the magnitude of at least one response may change over time based on user history information, user preference, manual user selections, and/or the like. For example, if the multiple spin or flick inputs are regularly detected in a short window of time, the controller 110 or a component thereof (e.g., the operation set updater 254 in FIG. 2) may infer that the response associated with the input-response pairing 460 may be tuned too low and need to be increased such that the displacement of the rotation operation is based on the velocity of the spin or flick input times an amplification or weight factor. One of ordinary skill in the art will appreciate that the input-response pairings (or the magnitude of the response(s) therein) may change over time in various ways.

For example, the operation set 450A at time $T_1$ corresponds to a first changed version of the operation set 450 from time $T_0$. In this example, the input-response pairings 452, 454, and 456 remain unchanged as compared to the operation set 450. However, a changed input-response pairing 458A includes 10% greater spatial displacement for the translation operation as compared to the input-response pairing 458 at time $T_0$. Similarly, a changed input-response pairing 460A includes 10% greater angular displacement for the rotation operation as compared to the input-response pairing 460 at time $T_0$, and a changed input-response pairing 462A includes 25% less size change for the scaling operation as compared to the input-response pairing 462 at time $T_0$.

For example, the operation set 450B at time $T_2$ corresponds to a second changed version of the operation set 450 from time $T_0$. In this example, the input-response pairings 452, 454, and 456 remain unchanged as compared to the operation set 450. However, a changed input-response pairing 458B includes 15% greater spatial displacement for the translation operation as compared to the input-response pairing 458 at time T$_0$. Similarly, a changed input-response pairing 460B includes 7.5% greater angular displacement for the rotation operation as compared to the input-response pairing 460 at time T$_0$, and a changed input-response pairing 462B includes 30% less size change for the scaling operation as compared to the input-response pairing 462 at time T$_0$.

Figure 5:
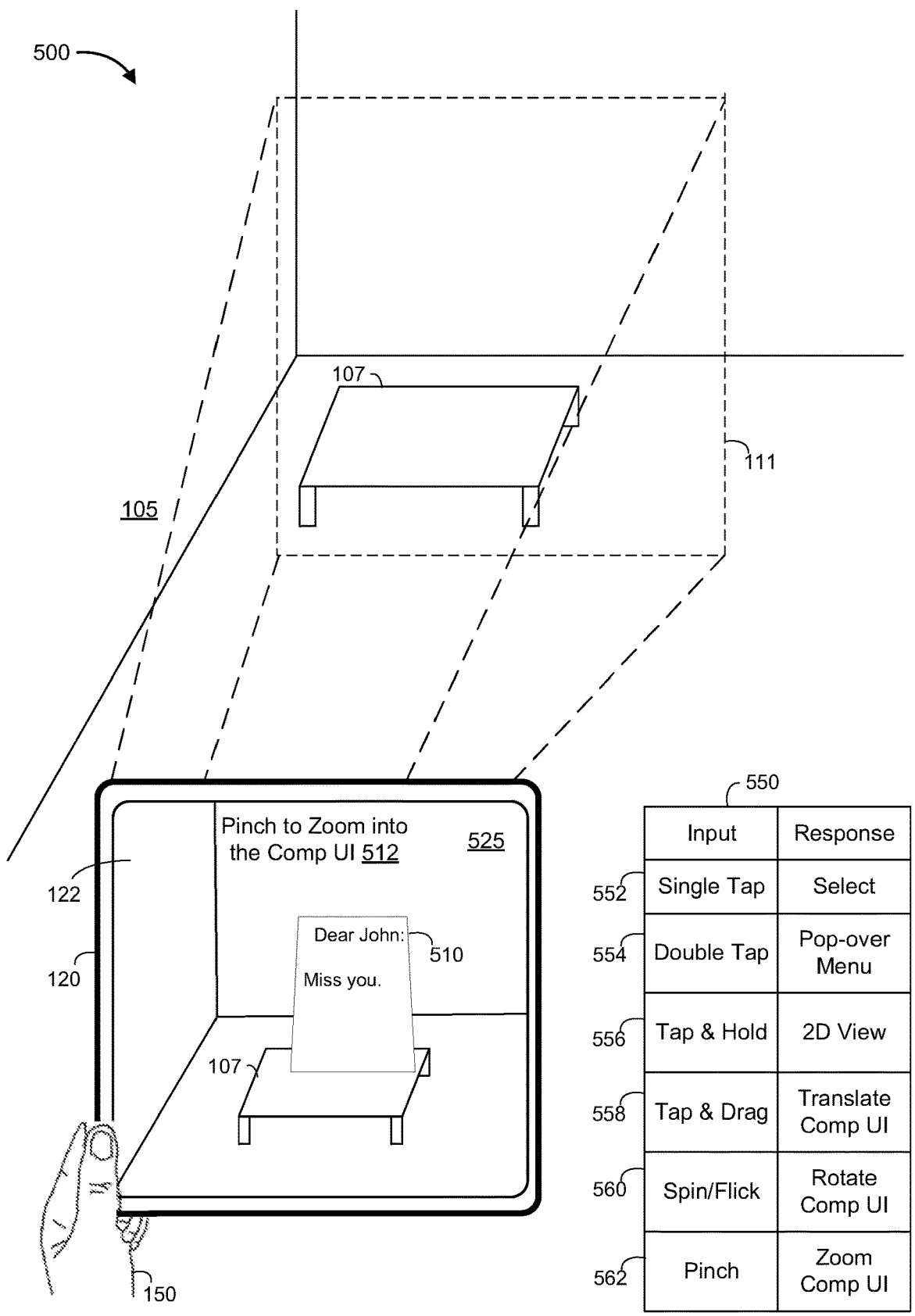
FIG. 5 illustrates another XR presentation scenario in accordance with some implementations.

FIG. 5 illustrates another example XR presentation scenario 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 5, the XR presentation scenario 500 includes a physical environment 105 and an XR environment 525 displayed on the display 122 of the electronic device 120. The electronic device 120 presents an XR environment 525 to the user 150 while the user 150 is physically present within the physical environment 105 that includes the table 107 within the FOV 111 of an exterior-facing image sensor of the electronic device 120. As such, in some implementations, the user 150 holds the electronic device 120 in his/her hand(s) similar to the operating environment 100 in FIG. 1.

In some implementations, the electronic device 120 is configured to present XR content and to enable video pass-through of at least a portion of the physical environment 105 (e.g., including the table 107) on the display 122. In some implementations, the electronic device 120 can include an additive display to present XR content and to enable optical see-through of at least a portion of the physical environment 105 (e.g., including the table 107) through the additive display. For example, the electronic device 120 corresponds to a mobile phone, tablet, laptop, wearable computing device, or the like. One of ordinary skill in the art will appreciate how the XR presentation scenario 500 may be adapted to suit a fully or partially virtual environment.

As shown in FIG. 5, the XR environment 525 is associated with a composition application. As such, the XR environment 525 includes a composition user interface (UI) 510 for drafting a letter, email, or the like. In the example shown in FIG. 5, an operation set 550 is associated with the composition UI 510 based on the composition application (e.g., default input-response pairings for the application), crowd-sourced information associated with the composition application, user history information associated with the composition application, user preferences, manual user selections (e.g., user created input-response pairings), and/or the like.

As shown in FIG. 5, the operation set 550 includes a plurality of input-response pairings: an input-response pairing 552 that corresponds to selecting the composition UI 510 or a portion thereof in response to a single tap input directed thereto; an input-response pairing 554 that corresponds to presenting a pop-over menu including additional operations (e.g., text color, font, background color, formatting tools, etc.) for performance on or within the composition UI 510 in response to a double tap input directed thereto; an input-response pairing 556 that corresponds to providing two-dimensional (2D) view of the composition UI 510 in response to a tap and hold input directed thereto; an input-response pairing 558 that corresponds to translating the composition UI 510 in response to a tap and drag input directed thereto (e.g., the displacement of the translation operation is based on the magnitude of the drag); an input-response pairing 560 that corresponds to rotating the composition UI 510 in response to a spin or flick input directed thereto (e.g., the displacement of the rotation operation is based on the velocity of the spin or flick); and an input-response pairing 562 that corresponds to zooming into or out of the composition UI 510 in response to a pinch input directed thereto (e.g., the rate of change of the zoom operation is based on the velocity or magnitude of the pinch). The XR environment 525 also includes an indication 512 informing the user 150 of the input-response pairing 562. One of ordinary skill in the art will appreciate that the input-response pairings in the operation set 550 may be modified in myriad ways. One of ordinary skill in the art will appreciate that the responses within the operation set 550 may differ based on the location of a user input. Furthermore, one of ordinary skill in the art will appreciate that various other input-response pairings may be added to the operation set 550.

Figure 6:
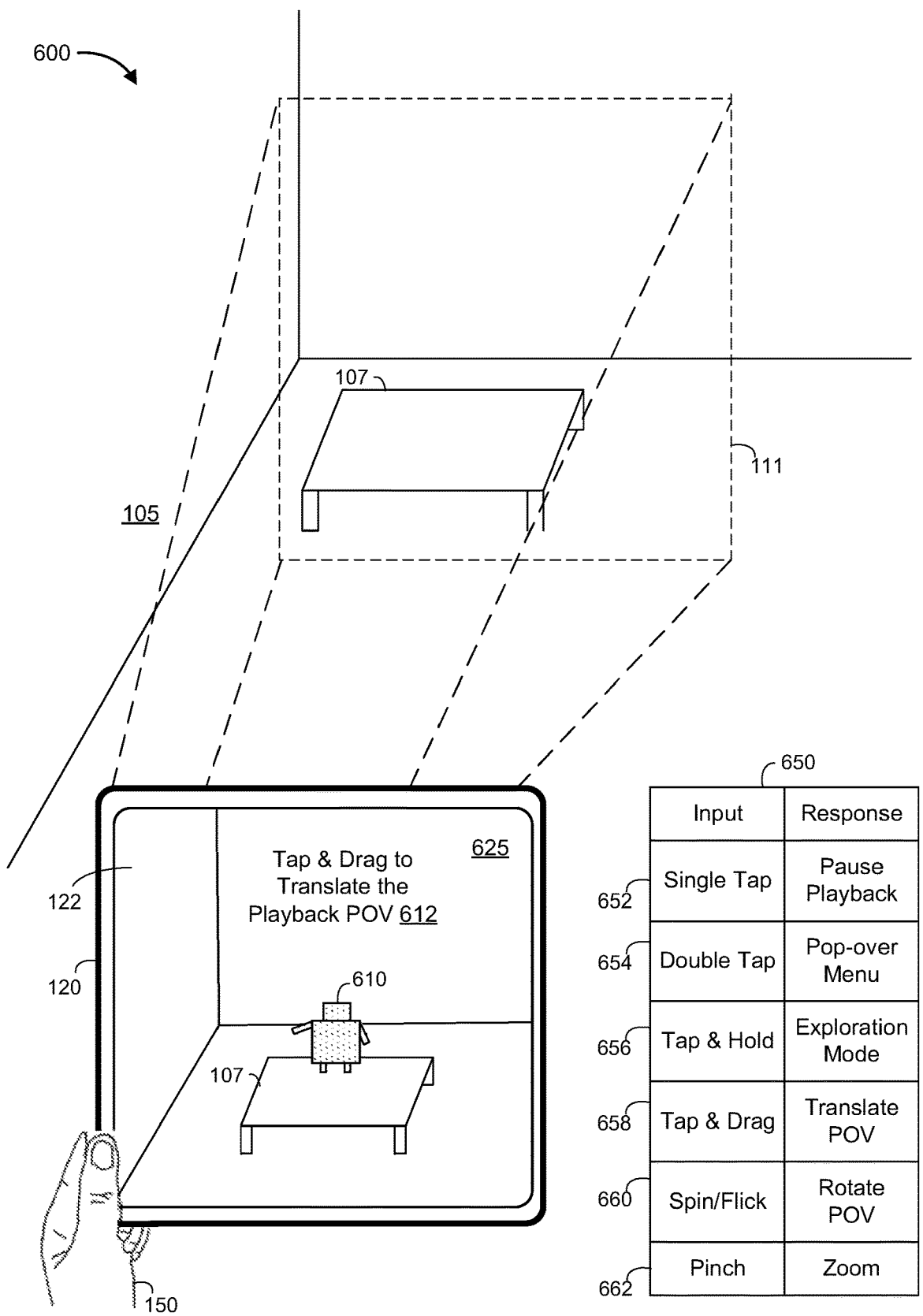
FIG. 6 illustrates yet another XR presentation scenario in accordance with some implementations.

FIG. 6 illustrates yet another example XR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 6, the XR presentation scenario 600 includes a physical environment 105 and an XR environment 625 displayed on the display 122 of the electronic device 120. The electronic device 120 presents an XR environment 625 to the user 150 while the user 150 is physically present within the physical environment 105 that includes the table 107 within the FOV 111 of an exterior-facing image sensor of the electronic device 120. As such, in some implementations, the user 150 holds the electronic device 120 in his/her hand(s) similar to the operating environment 100 in FIG. 1.

In some implementations, the electronic device 120 is configured to present XR content and to enable video pass-through of at least a portion of the physical environment 105 (e.g., including the table 107) on the display 122. For example, the electronic device 120 corresponds to a mobile phone, tablet, laptop, wearable computing device, or the like. In some implementations, the electronic device 120 can include an additive display to present XR content and to enable optical see-through of at least a portion of the physical environment 105 (e.g., including the table 107) through the additive display. For example, the electronic device 120 corresponds to a mobile phone, tablet, laptop, wearable computing device, or the like. One of ordinary skill in the art will appreciate how the XR presentation scenario 600 may be adapted to suit a fully or partially virtual environment.

As shown in FIG. 6, the XR environment 625 is associated with a content consumption application. As such, the XR environment 625 includes an XR object 610 associated with the content playback. In the example shown in FIG. 6, an operation set 650 is associated with the XR object 610 based on the content consumption application (e.g., default input-response pairings for the application), crowd-sourced information associated with the content consumption application, user history information associated with the content consumption application, user preferences, manual user selections (e.g., user created input-response pairings), and/or the like.

As shown in FIG. 6, the operation set 650 includes a plurality of input-response pairings: an input-response pairing 652 that corresponds to pausing the content in response to a single tap input directed thereto; an input-response pairing 654 that corresponds to presenting a pop-over menu including additional operations (e.g., playback speed, playback information, etc.) in response to a double tap input directed thereto; an input-response pairing 656 that corresponds to providing an exploration mode of the content (e.g., content playback is paused and the user is able to explore and/or introspect the XR environment) in response to a tap and hold input directed thereto; an input-response pairing 658 that corresponds to translating the point-of-view (POV) or camera pose relative to the XR object 610 in response to a tap and drag input directed thereto (e.g., the displacement of the translation operation is based on the magnitude of the drag); an input-response pairing 660 that corresponds to rotating the POV or camera pose relative to the XR object 610 in response to a spin or flick input directed thereto (e.g., the displacement of the rotation operation is based on the velocity of the spin or flick); and an input-response pairing 662 that corresponds to zooming into the XR object 610 in response to a pinch input directed thereto (e.g., the rate of change of the scaling operation is based on the velocity or magnitude of the pinch). The XR environment 625 also includes an indication 612 informing the user 150 of the input-response pairing 658. One of ordinary skill in the art will appreciate that the input-response pairings in the operation set 650 may be modified in myriad ways. One of ordinary skill in the art will appreciate that the responses within the operation set 650 may differ based on the location of a user input. Furthermore, one of ordinary skill in the art will appreciate that various other input-response pairings may be added to the operation set 650.

Figure 7:
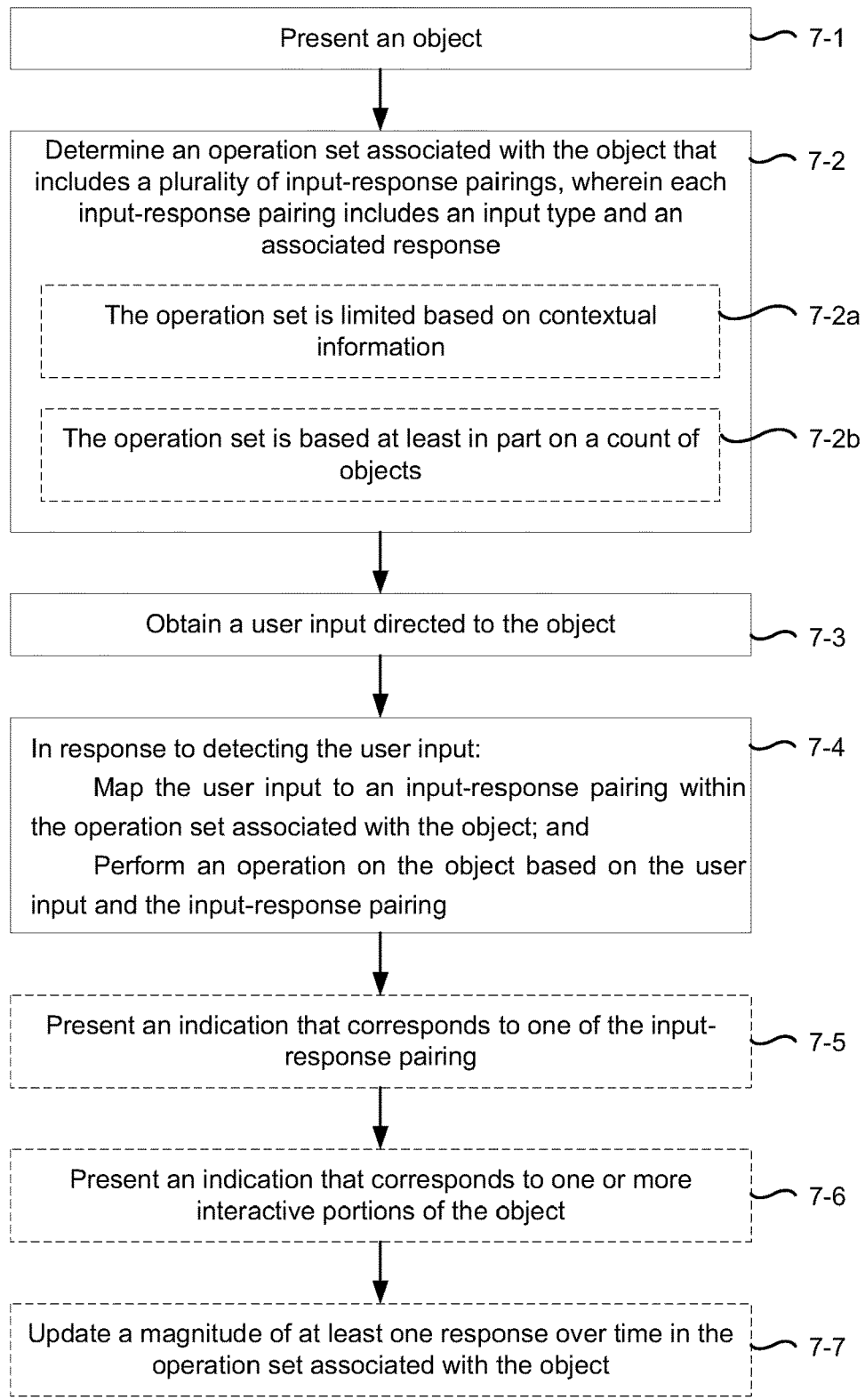
FIG. 7 is a flowchart representation of a method of assigning an operation set to an XR object in accordance with some implementations.

FIG. 7 is a flowchart representation of a method 700 of assigning an operation set to an XR object in accordance with some implementations. In various implementations, the method 700 is performed by a computing system including non-transitory memory and one or more processors, wherein the computing system is communicatively coupled to a display device and one or more input devices (e.g., the controller 110 in FIGS. 1 and 2; the electronic device 120 in FIGS. 1 and 3; or a suitable combination thereof), or a component thereof. In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

As described above, in some instances, developers of computer-generated (CG) or extended reality (XR) content applications may spend significant time and other resources programming various inputs (e.g., touch gestures, hand tracking, eye tracking, body pose, etc.) and the associated responses when performed on XR content. As such, in some implementations, an XR-based operating system (OS) may include pre-programmed input-response sets that a developer can assign to various resources objects. Use of such pre-programmed input-response sets provides a more consistent experience for end users across resources applications. Further, the pre-programmed input-response sets can be modified on the backend (e.g., made more efficient) for multiple applications. As one example, when an XR object is instantiated into an XR environment in an XR application development environment, the XR object may be associated with metadata (e.g., a default color, shape, transparency, default size, etc.). According to various implementations, the metadata may also include input-response pairings indicating gestures that can detected when directed at the XR object and the responses thereto (e.g., the operation set 450 in FIG. 4A).

As represented by block 7-1, the method 700 includes presenting an object (e.g., within a graphical environment). In some implementations, the object corresponds to an XR object presented within an XR environment (e.g., the XR object 410 shown in FIG. 4A). In some implementations, the object corresponds to a physical object that is detected/recognized with a physical environment.

In some implementations, the computing system or a component thereof (e.g., the presentation engine 246 in FIG. 2) renders the XR environment including the XR object. Continuing with this example, the presentation engine 246 is also configured to deliver the rendered XR environment to the electronic device 120 for presentation thereby. As shown in FIG. 4A, for example, the electronic device 120 presents the XR environment 425 that includes the XR object 410 created by the user 150 or imported into the XR environment 425 by the user 150. According to some implementations, the XR object is instantiated into the XR environment in response to a request from the user (e.g., selection from a menu/library of XR objects, voice request, or the like). According to some implementations, the XR object is preloaded with the XR environment. According to some implementations, the XR object is created by the user based on one or more content creation inputs (e.g., tracing/sculpting with hand/limb tracking inputs, building with component parts, etc.).

As represented by block 7-2, the method 700 includes determining an operation set associated with the object that includes a plurality of input-response pairings, wherein each input-response pairing includes an input type and an associated response. In some implementations, the computing system or a component thereof (e.g., the operation set determiner 252 in FIG. 2) determines an operation set for the object. As shown in FIG. 4A, for example, the operation set 450 is assigned to or associated with the XR object 410 based on the content creation application associated with the XR environment 425 (e.g., default input-response pairings for the application), crowd-sourced information associated with the content creation application, user history information associated with the content creation application, user preferences, manual user selections (e.g., input-response pairings set by the user), and/or the like.

In some implementations, the operation set is based on the application associated with the XR environment such as a content/asset creation application, composition application, content consumption application, or the like. For example, the user may have selected the XR object from a library/menu of XR objects that may be placed into the XR environment. In this example, the operation set for the XR object may be preset by the user or the creator of the XR object.

As another example, the XR object may have been created during a content/asset creation process (e.g., as shown in FIG. 4A). In this example, the operation set for the XR object may be selected by the user or based on the operation sets for similar XR objects.

As yet another example, the XR object may correspond to a composition or other user interface (e.g., as shown in FIG. 5). In this example, the operation set for the XR object may be based on the application associated with the user interface.

As yet another example, the XR object is associated with playback of audio/video content (e.g., as show in FIG. 6). In this example, the operation set for the XR object may be preset by the user or the creator of the XR object.

In some implementations, the operation set is pre-assigned to the XR object. As shown in FIG. 6, for example, the operation set 650 is pre-assigned to the XR object 610 by the creator/author of the XR object 610. For example, the user may modify the operation set by changing one or more input-response pairings, changing the response to an input, changing the magnitude of a response to an input, and/or a combination thereof.

In some implementations, as represented by block 7-2a, the operation set is limited based on contextual information. For example, the operation set is restricted or limited based on the physical (i.e., real-world) or XR environment such as its dimensions, layout, objects therein, safety reasons (e.g., a doorway, a staircase, a window, a range, etc.), and/or the like. For example, the operation set is restricted or limited based on if the user is a first-time or novice user. For example, the operation set is restricted or limited based on a profile associated with the user that includes age, geographic region, language, and/or the like.

In some implementations, as represented by block 7-2b, the operation set is based at least in part on a count of objects. For example, if there are two or more similar XR objects in the XR environment, the operation set may include additional operations for performing simultaneous actions on the two or more similar objects.

As represented by block 7-3, the method 700 includes obtaining a user input directed to the object (e.g., within the graphical environment). In some implementations, the user input corresponds to one of a touch gesture, a hand or limb tracking input, a body pose tracking input, an eye tracking input, and a voice command. In some implementations, the computing system or a component thereof (e.g., the I/O devices 206 of the controller 110, the electronic device 120, the one or more I/O devices and sensors 306 of the electronic device 120, and/or the optional remote input devices) detects the user input and provides an indication of the user input to the controller 110.

In response to detecting the user input, as represented by block 7-4, the method 700 includes: mapping the user input to an input-response pairing within the operation set associated with the object; and performing an operation on the object based on the user input and the input-response pairing. In some implementations, the computing system or a component thereof (e.g., the interaction and manipulation engine 248) interprets the user input directed to the object based on the operation set assigned to the XR by the operation set determiner 252. In some implementations, the operation corresponds to one of rotating the XR object, translating the XR object, scaling the XR object, coloring the XR object, texturing the XR object, shading the XR object, introspecting the XR object, providing an exploded view of the XR object, animating the XR object, bringing the XR object into focus, or the like. According to some implementations, the magnitude, etc. of the operation is based on the magnitude, velocity, acceleration, force, pressure, and/or the like of the user input In some implementations, as represented by block 7-5, the method 700 includes presenting an indication (e.g., within the graphical environment) that corresponds to one of the input-response pairing. As shown in FIG. 4A, for example, the XR environment 425 includes an indication 412 informing the user 150 of the input-response pairing 456. In some implementations, the computing system provides indications (e.g., overlay text or aural information) as to what gestures can be directed at an XR object and their associated responses based on crowd-sourced user history information such as most frequently used gestures. In some implementations, the computing system provides hints or tutorials as to what gestures can be directed at an XR object when the user is a first-time user, novice user, or upon request.

In some implementations, as represented by block 7-6, the method 700 includes presenting an indication (e.g., within the graphical environment) that corresponds to one or more interactive portions of the object. In some implementations, the computing system provides indications (e.g., overlay text or highlighted/colored portions) as to what portions of object are interactive.

In some implementations, as represented by block 7-7, the method 700 includes updating a magnitude of at least one response over time in the operation set associated with the object. According to some implementations, the magnitude of at least one response (e.g., scroll faster, spin with a greater angular magnitude or velocity, etc.) may change over time based on user history information, user preference, manual user selections, and/or the like. For example, with reference to FIG. 4A, if the multiple spin or flick inputs are regularly detected in a short window of time, the computing system or a component thereof (e.g., the operation set updater 254 in FIG. 2) infers that the response associated with the input-response pairing 460 may be tuned too low and need to be increased such that the displacement of the rotation operation is based on the velocity of the spin or flick input times an amplification or weight factor. One of ordinary skill in the art will appreciate that the input-response pairings (or the magnitude of the response(s) therein) may change over time in various ways.

For example, as shown in FIG. 4B, the operation set 450A at time $T_1$ corresponds to a first changed version of the operation set 450 from time $T_0$. In this example, the input-response pairings 452, 454, and 456 remain unchanged as compared to the operation set 450. However, a changed input-response pairing 458A includes 10% greater spatial displacement for the translation operation as compared to the input-response pairing 458 at time $T_0$. Similarly, a changed input-response pairing 460A includes 10% greater angular displacement for the rotation operation as compared to the input-response pairing 460 at time $T_0$, and a changed input-response pairing 462A includes 25% less size change for the scaling operation as compared to the input-response pairing 462 at time $T_0$.

In some implementations, the method 700 includes updating the operation set associated with the object to include at least one auto-complete sequence. According to some implementations, at least one auto-complete sequence may be added to an operation set based on user history information, user preference, manual user selections, and/or the like. For example, if a user typically performs A+B+C+D steps, the computing system or a component thereof (e.g., the operation set updater 254 in FIG. 2) adds an auto-complete sequence whereby, for example, the computing system will automatically perform step D after detecting the sequence of A+B+C steps.

In some implementations, the method 700 includes: presenting a second object (e.g., a second XR object within the XR environment); and determining a second operation set associated with the second object that includes a second plurality of input-response pairings, wherein each input-response pairing includes an input type and an associated response. In some implementations, the first operation set for the first object and the second operation set for the second object include at least one overlapping or different input-response pairing. In some implementations, the first operation set for the first object and the second operation set for the second object include mutually exclusive input-response pairings.

In some implementations, the object corresponds to a first application (e.g., within the graphical environment), and the method 700 includes: detecting a subsequent user input directed to changing from the first application to a second application; and in response to detecting the subsequent user input: presenting a second object that corresponds to the second application; and determining a second operation set associated with the second object that includes a second plurality of input-response pairings, wherein each input-response pairing includes an input type and an associated response. For example, the object corresponds a first XR object within a first XR environment associated with the first application, and the second object corresponds to a second XR object within a second XR environment associated with the second application. In some implementations, the first operation set for the first object associated with the first application and the second operation set for the second object associated with the second application include at least one overlapping or different input-response pairing. In some implementations, the first operation set for the first object in the first associated with the first application and the second operation set for the second object associated with the second application include mutually exclusive input-response pairings.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a computing system including non-transitory memory and one or more processors, wherein the computing system is communicatively coupled to a display device and one or more input devices:
        while presenting an object via the display device, determining contextual information associated with a physical environment, wherein the contextual information associated with the physical environment includes two or more dimensions for the physical environment;
        in accordance with a determination that the contextual information associated with the physical environment corresponds to a first context associated with the physical environment, associating a first operation set with the object that includes a first plurality of input-response pairings, wherein each of the first plurality of input-response pairings includes an input type and an associated response; and
        in accordance with a determination that the contextual information associated with the physical environment corresponds to a second context associated with the physical environment different from the first context, associating a second operation set with the object that includes a second plurality of input-response pairings that is a subset of the first plurality of input-response pairings included in the first operation set.

2. The method of claim 1, wherein the contextual information associated with the physical environment further includes a layout of the physical environment or safety conditions within the physical environment.

3. The method of claim 1, wherein the contextual information is associated with one or more characteristics of a user of the computing system and the physical environment.

4. The method of claim 1, wherein the first and second operation sets are further based at least in part on a count of objects.

5. The method of claim 1, further comprising:
    while presenting the object, presenting, via the display device, one or more indications associated with one or more interactive portions of the object.

6. The method of claim 1, further comprising:
    while the object is associated with the first operation set, obtaining, via the one or more input devices, a user input directed to the object; and
    in response to detecting the user input:
        mapping the user input to an input-response pairing within the first operation set, wherein the input-response pairing includes an input type and an associated response; and performing an operation on the object based on the user input and the input-response pairing.

7. The method of claim 6, wherein the user input corresponds to one of a touch gesture, a hand or limb tracking input, a body pose tracking input, an eye tracking input, and a voice command.

8. The method of claim 6, wherein the operation corresponds to one of rotating, translating, scaling, coloring, texturing, shading, introspecting, exploding, animating, or bringing into focus the object.

9. The method of claim 6, further comprising:
after performing the operation on the object, modifying at least one of the first plurality of input-response pairings based at least in part on the user input.

10. The method of claim 9, wherein modifying at least one of the first plurality of input-response pairings corresponds to updating a magnitude of at least one response associated with a respective input-response pairing among the first plurality of input-response pairings within the first operation set.

11. The method of claim 9, wherein modifying at least one of the first plurality of input-response pairings corresponds to updating at least one input-response pairing among the first plurality of input-response pairings within the first operation set to an auto-complete sequence.

12. The method of claim 1, further comprising:
while the object is associated with the first operation set, presenting, via the display device, a first indication that corresponds to at least one of input-response pairing within the first operation set; and
while the object is associated with the second operation set, presenting, via the display device, a second indication that corresponds to at least one of input-response pairing within the second operation set.

13. The method of claim 1, wherein the object corresponds to an extended reality (XR) object presented within an XR environment.

14. The method of claim 1, wherein the object corresponds to a physical object recognized within the physical environment.

15. The method of claim 1, wherein the physical environment corresponds to surroundings of a user of the computing system.

16. A device comprising:
one or more processors;
a non-transitory memory;
an interface for communicating with a display device and one or more input devices; and
one or more programs stored in the non-transitory memory, which, when executed by the one or more processors, cause the device to:
while presenting an object via the display device, determine contextual information associated with a physical environment, wherein the contextual information associated with the physical environment includes two or more dimensions for the physical environment;
in accordance with a determination that the contextual information associated with the physical environment corresponds to a first context associated with the physical environment, associate a first operation set with the object that includes a first plurality of input-response pairings, wherein each of the first plurality of input-response pairings includes an input type and an associated response; and
in accordance with a determination that the contextual information associated with the physical environment corresponds to a second context associated with the physical environment different from the first context, associate a second operation set with the object that includes a second plurality of input-response pairings that is a subset of the first plurality of input-response pairings included in the first operation set.

17. The device of claim 16, wherein the contextual information associated with the physical environment further includes a layout of the physical environment or safety conditions within the physical environment.

18. The device of claim 16, wherein the contextual information is associated with one or more characteristics of a user of the device and the physical environment.

19. The device of claim 16, wherein the first and second operation sets are further based at least in part on a count of objects.

20. A non-transitory memory storing one or more programs, which, when executed by one or more processors of a device with an interface for communicating with a display device and one or more input devices, cause the device to:
while presenting an object via the display device, determine contextual information associated with a physical environment, wherein the contextual information associated with the physical environment includes two or more dimensions for the physical environment;
in accordance with a determination that the contextual information associated with the physical environment corresponds to a first context associated with the physical environment, associate a first operation set with the object that includes a first plurality of input-response pairings, wherein each of the first plurality of input-response pairings includes an input type and an associated response; and
in accordance with a determination that the contextual information associated with the physical environment corresponds to a second context associated with the physical environment different from the first context, associate a second operation set with the object that includes a second plurality of input-response pairings that is a subset of the first plurality of input-response pairings included in the first operation set.

21. The non-transitory memory of claim 20, wherein the contextual information associated with the physical environment further includes a layout of the physical environment or safety conditions within the physical environment.

22. The non-transitory memory of claim 20, wherein the contextual information is associated with one or more characteristics of a user of the device and the physical environment.

23. The non-transitory memory of claim 20, wherein the first and second operation sets are further based at least in part on a count of objects.

* * * * *